(12) United States Patent
Wilson et al.

(10) Patent No.: US 7,278,307 B2
(45) Date of Patent: Oct. 9, 2007

(54) NON-ATTACHED TIRE MONITORING DEVICE

(75) Inventors: Paul B. Wilson, Tallmadge, OH (US); John D. Rensel, Tallmadge, OH (US); Frank L. Merat, University Heights, OH (US); Gordon E. Hardman, Boulder, CO (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 211 days.

(21) Appl. No.: 11/237,458

(22) Filed: Sep. 27, 2005

(65) Prior Publication Data
US 2006/0021425 A1  Feb. 2, 2006

Related U.S. Application Data

(62) Division of application No. 10/771,615, filed on Feb. 4, 2004, now Pat. No. 6,966,221.

(60) Provisional application No. 60/445,074, filed on Feb. 4, 2003.

(51) Int. Cl.
*G01M 17/02* (2006.01)

(52) U.S. Cl. .................................................. 73/146.5
(58) Field of Classification Search ................ 73/146, 73/146.2, 146.3, 146.4, 146.5, 146.8; 340/442
See application file for complete search history.

(56) References Cited

U.S. PATENT DOCUMENTS

| | | | |
|---|---|---|---|
| 4,169,497 A | 10/1979 | Tsuruta | |
| 4,343,338 A | 8/1982 | Hart | |
| 5,679,187 A | 10/1997 | Price | |
| 5,938,868 A | 8/1999 | Miura | |
| 6,612,657 B1 * | 9/2003 | Fakhoury et al. | 301/105.1 |

* cited by examiner

*Primary Examiner*—Andre J. Allen
(74) *Attorney, Agent, or Firm*—Fred H. Zollinger, III; Thomas R. Kingsbury (57) ABSTRACT

A non-attached monitoring device includes monitoring assembly and an antenna configured to radiate signals from the monitoring assembly. The antenna is configured to radiate through the oriented attenuating body of the tire sidewall regardless of the position of the monitoring device with respect to the tire sidewall. In one embodiment, the antenna has a body that is looped back on itself. The body may be parallel to or perpendicular to the antenna ground plane. In another embodiment, a radiating slot antenna is configured to provide transmissions through the tire sidewall regardless of the position of the monitoring device.

20 Claims, 8 Drawing Sheets

NON-ATTACHED TIRE MONITORING DEVICE

CROSS REFERENCE TO RELATED APPLICATIONS

This application is a divisional application claiming priority from U.S. patent application Ser. No. 10/771,615 filed Feb. 4, 2004, now U.S. Pat. No. 6,966,221 which claims priority from U.S. patent application Ser. No. 60/445,074 filed Feb. 4, 2003; the disclosure of both are incorporated herein by reference.

BACKGROUND OF THE INVENTION

1. Technical Field

The present invention generally relates to non-attached monitoring devices and antenna configurations for transmitting through an oriented attenuating body. More particularly, the present invention is related to a non-attached monitoring device that is free to move about within the cavity formed by the tire and the rim on which the tire is mounted. Specifically, the present invention relates to the configuration of the device antenna and its ability to transmit data through the attenuating body of the tire sidewall.

2. Background Information

Monitoring conditions of pneumatic tires while they are installed and in use on a particular vehicle is desired in the art. The users of this technology particularly desire to measure the internal temperature and internal pressure of a tire. These non-destructive measurements are preferably taken while the tire is in use without having to remove the tire from the vehicle or otherwise interrupt the use of the vehicle to take the measurements. It is particularly desirable to monitor the conditions and statistics of large off-the-road truck tires because the off-the-road tires are expensive and subject to harsher conditions than typical passenger car tires. Owners of highway trucks also desire to monitor their tires. Both types of tires must be regularly maintained to maximize vehicle usage and tire efficiency.

Numerous types of monitoring devices are known in the art. One type of known monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active, self-powered programmable electronic devices are disclosed in U.S. Pat. Nos. 5,500,065, 5,573,610, 5,562,787, and 5,573,611 which are assigned to the Assignee of the present application.

The prior art attachment problems exist because the forces on an electronic monitoring device while connected to a pneumatic tire are significant and numerous. The forces in the footprint area of the tire must be considered when mounting a monitoring device. Tires are subject to rotational forces when the vehicle is moving and also to various impact forces when the tire contacts surface irregularities. The tire will also deform and deflect during maneuvering because the loads to the wheel change. The attachment of the monitoring device to the tire must be strong enough and secure enough to maintain the position of the monitoring device with respect to the tire while experiencing all of these forces while also protecting the monitoring device from damage resulting from these forces. These concerns have lead to the use of non-attached monitoring devices such as those disclosed in U.S. Pat. No. 6,082,192 (commonly assigned) and U.S. Pat. No. 4,067,235.

One drawback with these devices is that their freedom of movement prevents the position of the antenna from being accurately predicted while the monitoring device is in use. The art recognizes that the position of the antenna with respect to the tire sidewall is an important factor when attempting to radiate a radio frequency signal through certain tire sidewall constructions. The rubber composite materials used in tire constructions may include a conductive material such as carbon black. These materials can attenuate the signal of some radio frequency transmissions through the tire sidewall or other tire structure. Some tire constructions such as those commonly used in certain highway truck tires and off-the-road tires can also include metal cords. For example, a plurality of metal cords oriented radially may be present in the sidewall area of these tires. Such metal structures will provide additional attenuation of a radio frequency signal passing through the tire sidewall. The orientation of the metal cords in the tire structure in relation to the orientation of the electromagnetic field associated with a radio signal passing through the tire sidewall will determine the degree of additional attenuation that the presence of the metal cords imparts upon the radio signal. Therefore, a tire structure of this type is termed an "oriented" attenuating body. The electromagnetic field orientation is a direct result of the type and orientation of antenna used in transmitting the radio signal. Certain antenna configurations provide more desirable transmissibility through the oriented attenuating body than other antenna configurations. One known antenna configuration is disclosed in U.S. Pat. No. 6,474,380 (commonly assigned) wherein a dipole antenna is fixed to the sidewall and disposed perpendicular to the metal body cords. This type of antenna configuration is not typically used with non-attached monitoring devices because the movement of the monitoring device does not allow the antenna to remain perpendicular to the metal body cords during all transmissions. Some prior art solutions have attempted to control the position of the non-attached monitoring device within the tire so that the antenna would be in a predictable position with respect to the tire sidewall. The art desires a monitoring device and antenna configuration that will provide signal transmissions through the tire sidewall regardless of the position of the monitoring device with respect to the tire sidewall.

BRIEF SUMMARY OF THE INVENTION

The invention provides a monitoring device having a monitoring assembly and an antenna configured to radiate signals from the monitoring assembly. The antenna is configured to successfully radiate a substantial portion of the radio signal through the oriented attenuating body of the tire sidewall regardless of the position of the monitoring device with respect to the tire sidewall. In one embodiment, the antenna has a body that is looped back on itself. The body may be parallel to or perpendicular to the antenna ground plane. In another embodiment, the invention provides an antenna body disposed at an angle between zero and 90 with respect to the antenna ground plane.

The invention also provides monitoring device embodiments that each have a different radiating slot antenna configured to provide transmissions through the tire sidewall regardless of the position of the monitoring device. The first embodiment uses a single slot formed by a pair of disc-shaped conductive surfaces. The second embodiment uses a pair of slots formed by two pairs of disc-shaped conductive surfaces. The third embodiment uses a pair of conductive surfaces that form a serpentine slot at the outer surface of the monitoring device.

The invention also provides an antenna configuration that may be disposed within the encapsulation layer of the monitoring device or within the protective body of the monitoring device.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
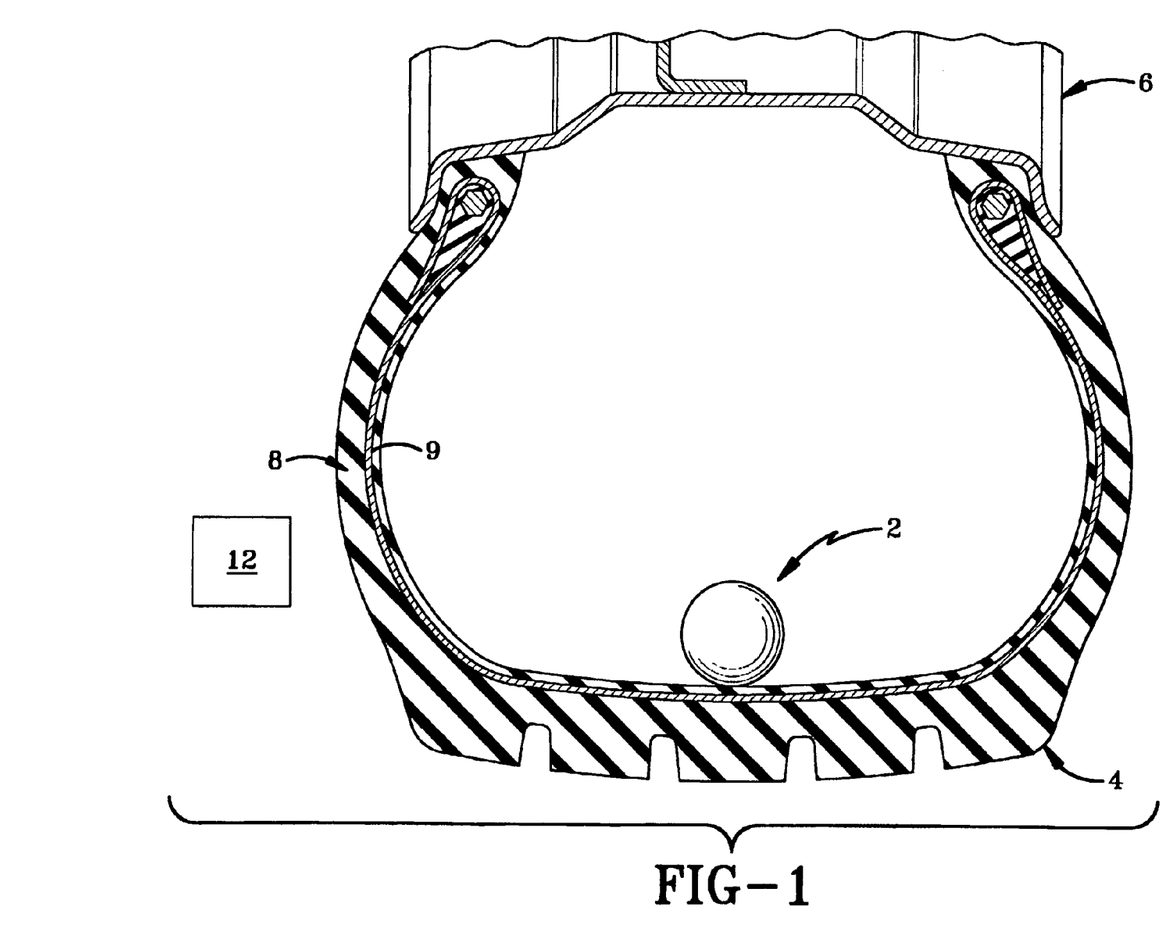
FIG. 1 is a view of a reader disposed outside a sectioned pneumatic tire with one embodiment of the monitoring device of the present invention loosely disposed in the tire.

The electronic monitoring device using the antenna configuration of the present invention is indicated generally by the numeral 2 in the accompanying drawings. Monitoring device 2 is loosely disposed within a pneumatic tire 4 in FIG. 1 such that the movement of monitoring device 2 is only restricted by the body of tire 4 and the rim 6 on which tire 4 is mounted. As described above, this type of monitoring device does not have to be mounted to tire 4 or rim 6. One drawback to the free movement is that the antenna 10 of monitoring device 2 does not maintain a consistent orientation with respect to tire 4 or rim 6. This is a problem because tire 2 typically has a sidewall 8 that functions as an attenuating body because sidewall 8 includes a plurality of metal cords 9. In the case of tire 2, the attenuating body is oriented. In the context of this application, an "oriented" attenuating body will impede signals of one orientation to a lesser degree than signals of another orientation. An oriented attenuating body thus has a minimum attenuating level and a maximum attenuating level depending on the orientation of the signal being attenuated by the body. The maximum attenuating level may prevent signals from being received by the reader monitoring the transmissions from the monitoring device. If the orientation of the antenna were fixed with respect to the sidewall, a most favorable or optimal antenna orientation would exist as well as a least favorable antenna orientation. In a non-attached monitoring device, the orientation of the antenna with respect to the sidewall changes. Prior art monitoring device antennas would thus be positioned in less than optimal orientations when used with a non-attached monitoring device. The antennas described below are thus configured to provide a radio signal orientation capable of successfully passing through sidewall 8 regardless of the orientation of device 2 with respect to sidewall 8. The antennas thus provide constant performance independent of the position of the monitoring device.

Figure 2:
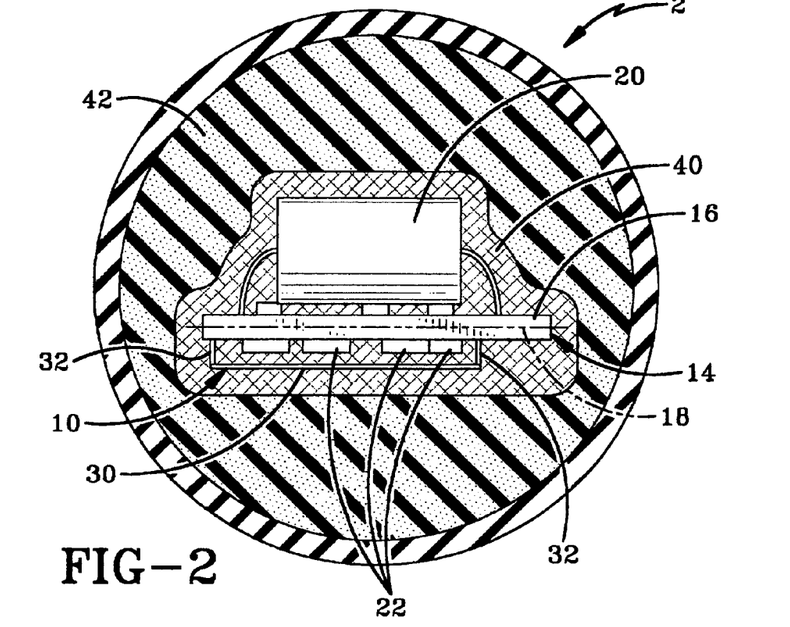
FIG. 2 is a front elevation view of the first embodiment of the monitoring assembly of the present invention with the protective body of the monitoring device shown in section.
Figure 3:
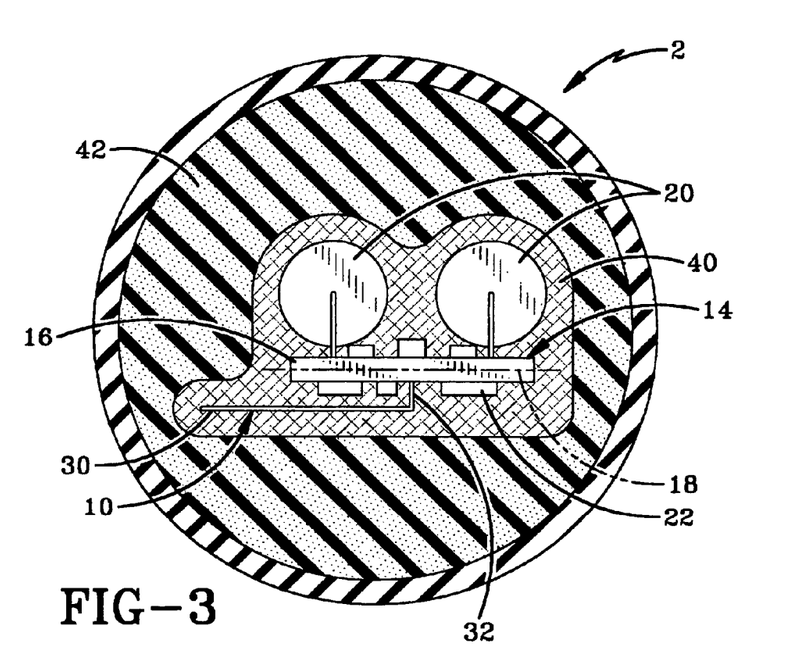
FIG. 3 is a side elevation view of the first embodiment of the monitoring assembly.
Figure 4:
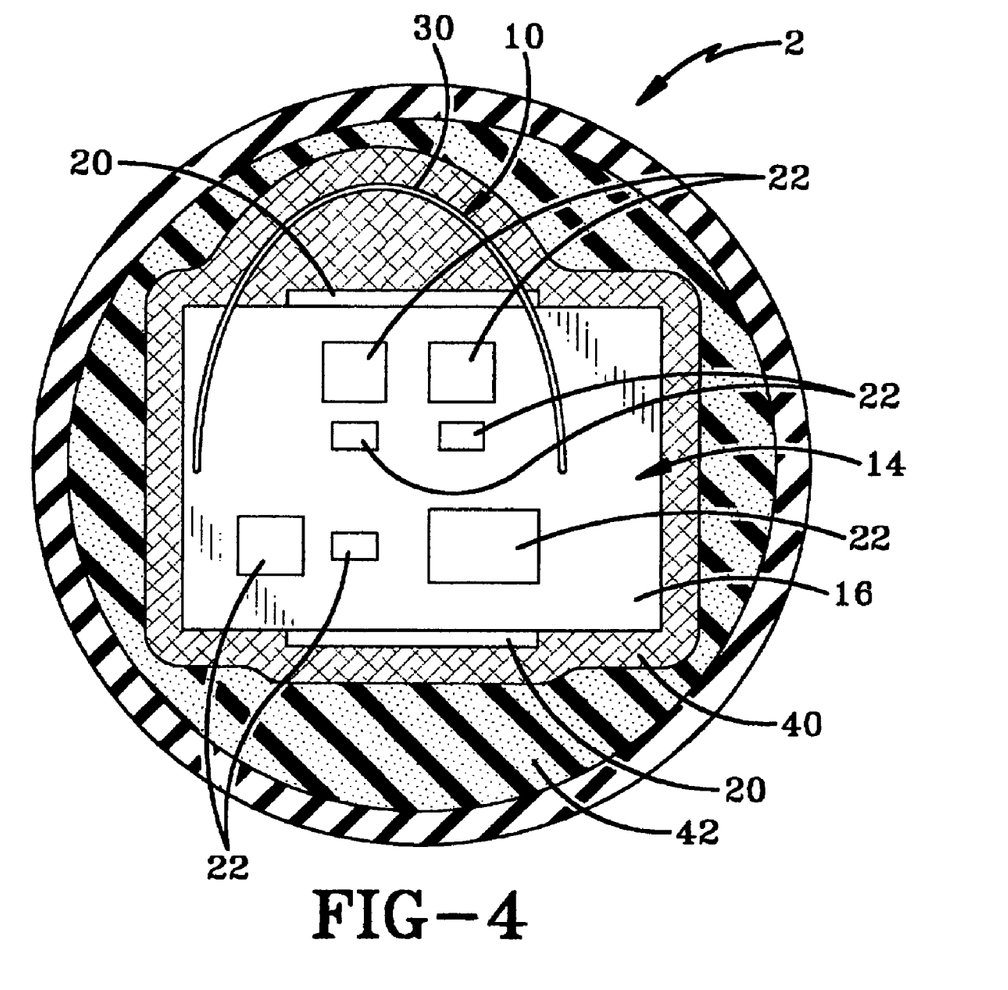
FIG. 4 is a bottom plan view of the first embodiment of the monitoring assembly.
Figure 5:
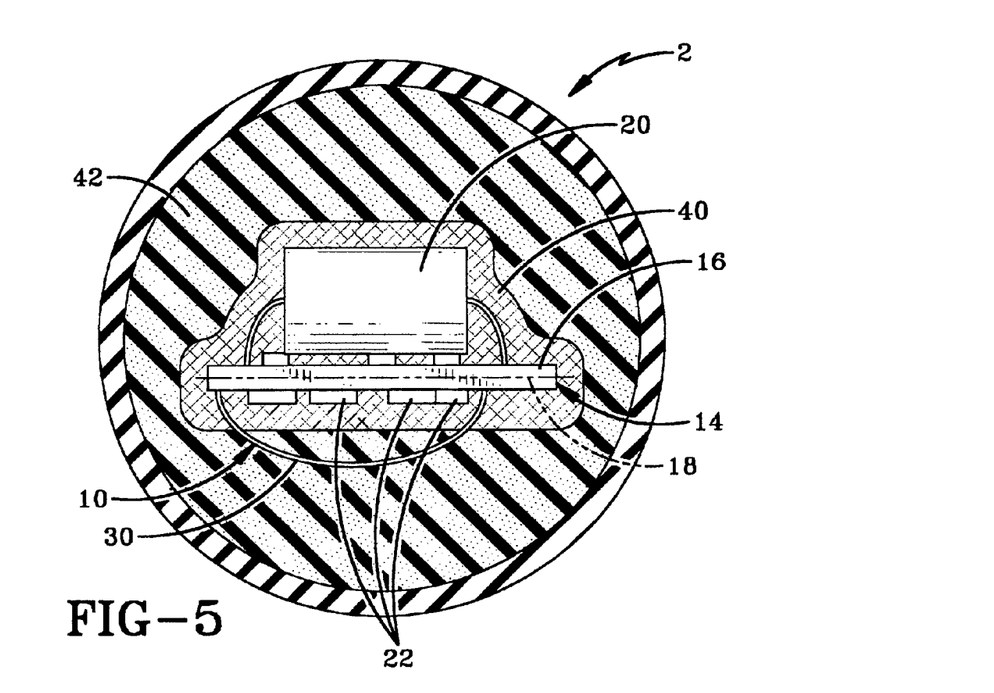
FIG. 5 is a front elevation view of a second embodiment of the monitoring assembly of the present invention with the protective body of the monitoring device shown in section.
Figure 6:
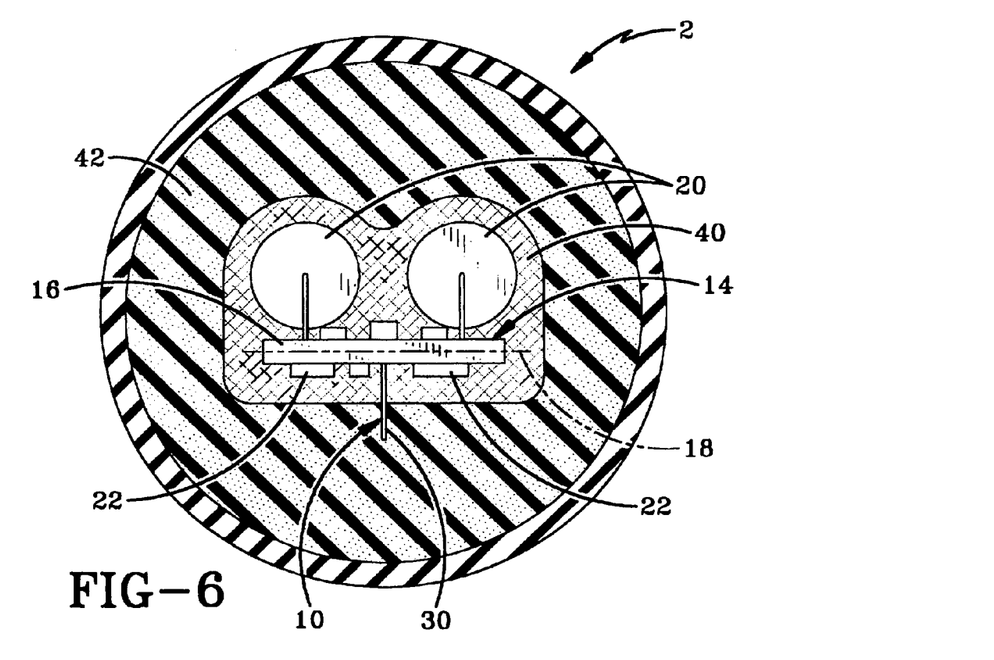
FIG. 6 is a side elevation view of the second embodiment of the monitoring assembly.
Figure 7:
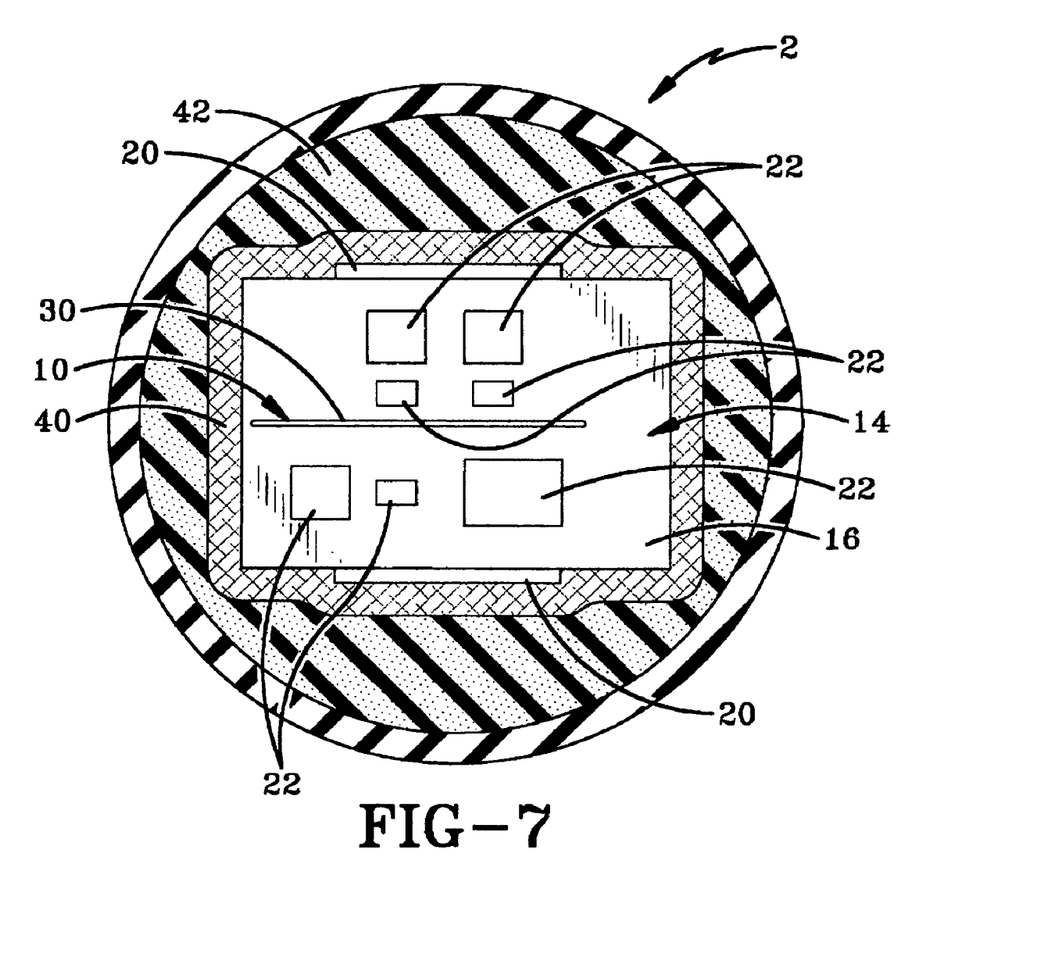
FIG. 7 is a bottom plan view of the second embodiment of the monitoring assembly.

FIGS. 2-4 depict a first embodiment of antenna 10 while FIGS. 5-7 depict a second embodiment of antenna 10. Each antenna embodiment 10 is configured to provide a transmission pattern having at least one portion that is not so severely attenuated by sidewall 8 such that a reader 12 positioned outside sidewall 8 will receive a signal regardless of the orientation of device 2 with respect to sidewall 8. In some embodiments, the signal received by reader 12 will have a constant strength as device 2 tumbles within the chamber of tire 4.

All of the antenna embodiments shown in this application are depicted in use with an exemplary monitoring assembly 14 having a circuit board 16 that is disposed in a circuit board reference plane 18. Reference plane 18 is disposed coplanar with the drawing sheet in FIGS. 4 and 7 and perpendicular to the drawing sheet in FIGS. 2, 3, 5, 6, 8, and 10. Monitoring assembly 14 may also include a power source such as the batteries 20 shown in the drawings. Monitoring assembly 14 further includes the sensors and electronics 22 that are used to measure an engineering condition of tire 4 (such as temperature or pressure) and transmit data by RF transmission through antenna 10 relating to the condition to a reader positioned outside tire 4. The specific sensors and electronics may vary but may be any one of the various configurations known in the art. Exemplary monitoring assemblies are cited above.

For example, monitoring assembly 14 may include one or more microchips, one or more amplifiers, one or more batteries, one or more sensors such as pressure, temperature, and/or mileage/distance sensors. While not shown in the drawings, it is envisioned that the microchip itself can contain all or some of the aforementioned components. Assembly 14 may be active or passive depending on the type of reader and system used.

The first embodiment of antenna 10 has a body 30 disposed substantially parallel to reference plane 18. In this embodiment, circuit board 16 functions as the ground plane for antenna 10. Body 30 may be disposed in or on circuit board 16 or may be spaced from board 16 as shown in the drawings. When a spaced configuration is desired, legs 32 are provided with at least one of the legs 32 electrically connected to the electronic component that sends the signal to be radiated from antenna 10. Legs 32 may also radiate signals in an orientation perpendicular to body 30. The second embodiment of antenna 10 is shown in FIGS. 5-7 wherein body 30 is disposed perpendicular to reference plane 18 as shown in FIG. 6. In other alternative embodiments of the invention, body 30 of antenna 10 may be disposed at an angle between zero and 90 degrees.

Each body 30 is looped back on itself to create signals of different orientations that will be attenuated differently by sidewall 8. In one embodiment, body 30 may only contain a 90 degree arc. In the embodiments shown in the drawings, body 30 forms at least a half loop that contains a 180 degree arc. The half loop may follow a generally smooth circular path, a generally smooth oval path, or a wavy path. The signals transmitted from body 30 are thus disposed at all angles from zero to 180 degrees with respect to the ground plane. The 180 degree signal radiation pattern ensures that one area of body 30 will be desirably disposed (these signals will be attenuated at the minimum attenuation level) with respect to sidewall 8 regardless of the orientation of monitoring device 2 with respect to sidewall 8. Monitoring device 2 may thus tumble about within tire 4 while still transmitting signals to reader 12 outside of tire 2.

Both antenna embodiments 10 may be contained within the compact body of monitoring device 2 because the body 30 is looped back over board 16. Antenna 10 may thus be encapsulated with monitoring assembly 14 inside the rigid encapsulation material 40 as shown in FIGS. 2-4. This material may be a rigid epoxy that protects assembly 14 and antenna 10 from significant bending forces by maintaining their relative positions. Antenna 10 may also extend into the protective body 42 of monitoring device 2 as shown in FIGS. 5-7. Exemplary encapsulation layers and exemplary protective bodies are disclosed in U.S. Pat. No. 6,082,192 which are incorporated herein by reference.

Figure 8:
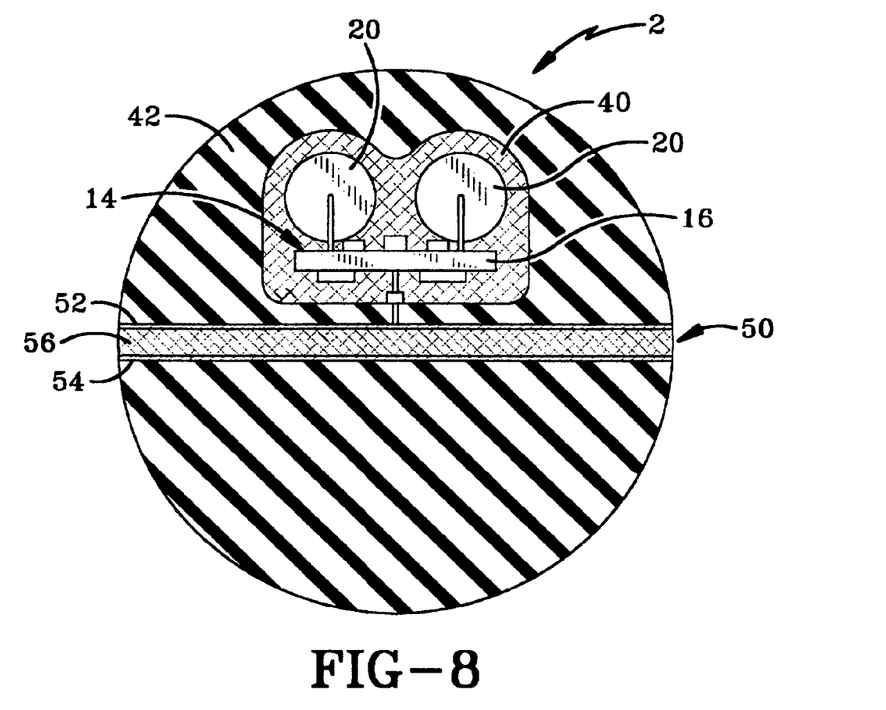
FIG. 8 is a section view of a third embodiment of the monitoring device of the present invention with the monitoring assembly shown in elevation.
Figure 9:
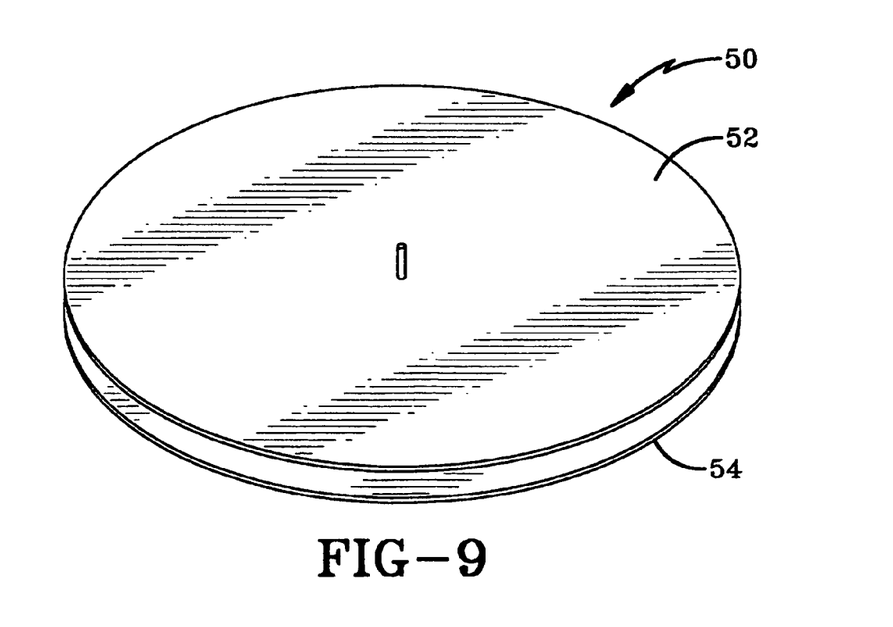
FIG. 9 is a perspective view of the antenna used in the third embodiment of the monitoring device of the present invention.

A third embodiment of the monitoring device of the invention is indicated generally by the numeral 2 in FIG. 8. In this embodiment, the antenna 50 includes a pair of spaced conductive bodies 52 and 54 that extend through the body of device 2. In this embodiment and in the following embodiments, conductive bodies 52 and 54 may be conductive foils or conductive coatings disposed on the body portions of device 2. In the exemplary embodiment, each body 52 and 54 is disc-shaped as shown in FIG. 9. In other embodiments, the outer slot defined by the intersection of the bodies 52 and 54 with the outer surface of the body of device 2 may be circular while the bodies are curved inside the body of device 2. For example, bodies 52 and 54 may be portions of concentric spheres disposed with the body of device 2. Bodies 52 and 54 are spaced apart to form a cavity that extends to the outer surface of the body of device 2 and defines a slot about the equator of device 2. The cavity may be filled with a dielectric filler material 56. In other embodiments, the cavity may be left hollow with mechanical spacers used to maintain the spacing between bodies 52 and 54. The size and spacing of bodies 52 and 54 and the type of material 56 are used to tune antenna 50. Bodies 52 and 54 thus divide the body of device 2 into two portions. In the exemplary embodiment, monitoring assembly 14 is shown in one hemisphere such that device 2 would be weighted to stop in a predictable orientation. In other embodiments, the other hemisphere may be counterweighted to balance device 2.

Antenna 50 is fed at the center of one of bodies 52 and 54 while the other body 52 and 54 acts as the ground plane for antenna 50. When fed at its center, antenna 50 will radiate signals from the entire circumference of the slot. Some portion of the radiated signal will thus pass through sidewall 8 regardless of the orientation of device 2.

Figure 10:
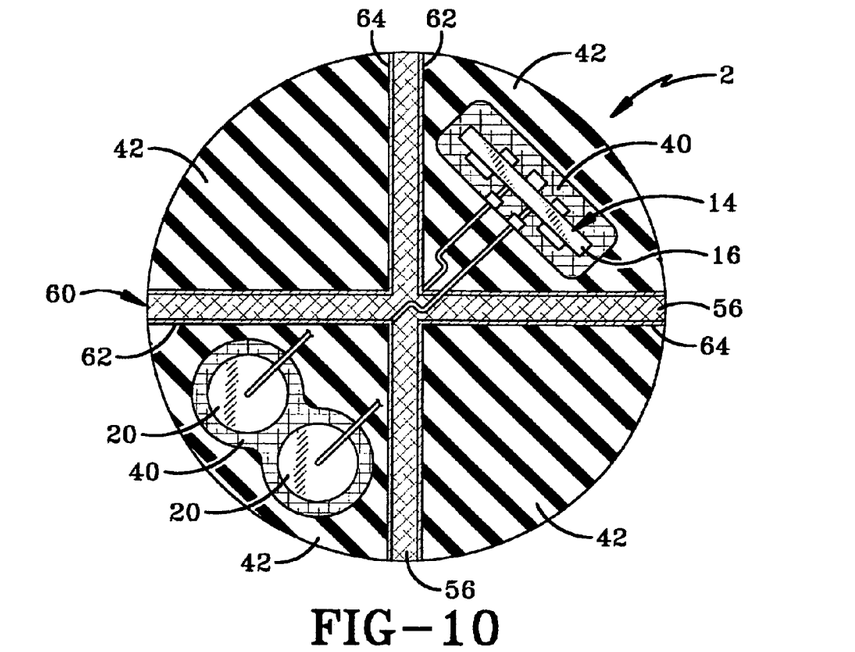
FIG. 10 is a view similar to FIG. 8 showing a fourth embodiment of the monitoring device of the invention.
Figure 11:
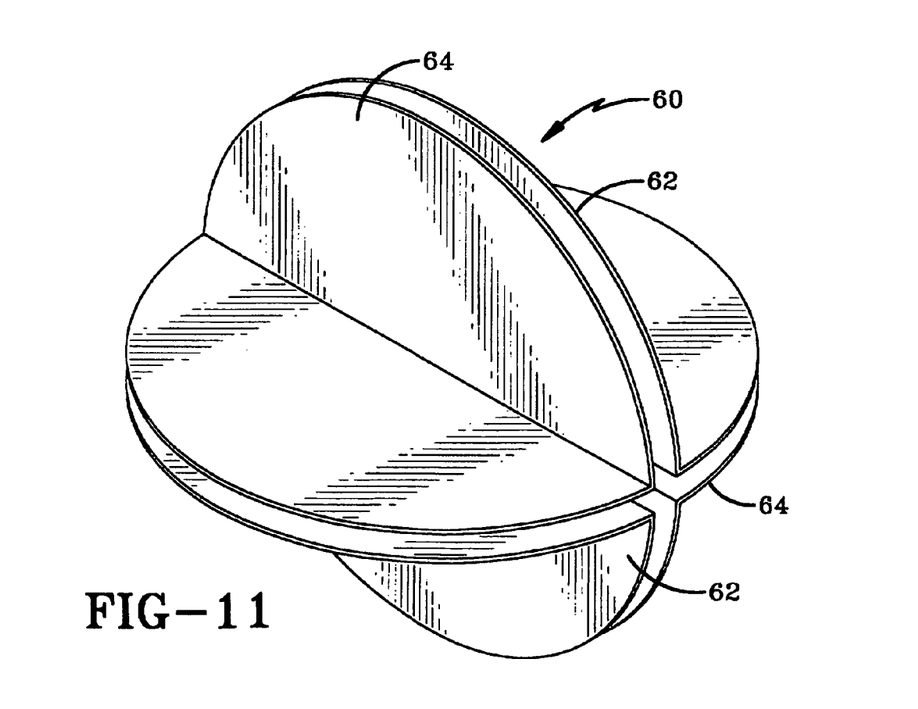
FIG. 11 is a perspective view of the antenna used in the fourth embodiment of the monitoring device of the present invention.

A fourth embodiment of the monitoring device of the invention is indicated generally by the numeral 2 in FIG. 10. In this embodiment, the antenna 60 includes a two pairs of spaced conductive bodies 62 and 64 that extend through the body of device 2. Bodies 62 and 64 each have first and second planar leg portions disposed perpendicular to each other with the outer edge of each leg being curved. In the exemplary embodiment, each body 62 and 64 is the shape of the inner surface of a quarter sphere as shown in FIG. 11. Bodies 62 and 64 are spaced apart to form a cavity that extends out of the body of device 2 in a pair of slots about perpendicular equators of device 2. The cavity may be filled with a filler material 56. In other embodiments, the cavity may be left hollow with mechanical spacers used to maintain the spacing between bodies 62 and 64. The size and spacing of bodies 62 and 64 and the type of material 56 are used to tune antenna 60. Bodies 62 and 64 thus divide the body of device 2 into four portions. In the exemplary embodiment, monitoring assembly 14 and batteries 20 are shown in opposed quadrants such that device 2 is evenly weighted. Weights may also be added to the other quadrants if needed.

Antenna 60 is fed at the center of the two opposed bodies 62 while the other bodies 64 function as the ground plane of antenna 60. Antenna 60 will radiate signals from the entire circumference of both slots. Some portion of the radiated signals will thus pass through sidewall 8 regardless of the orientation of device 2.

Figure 12:
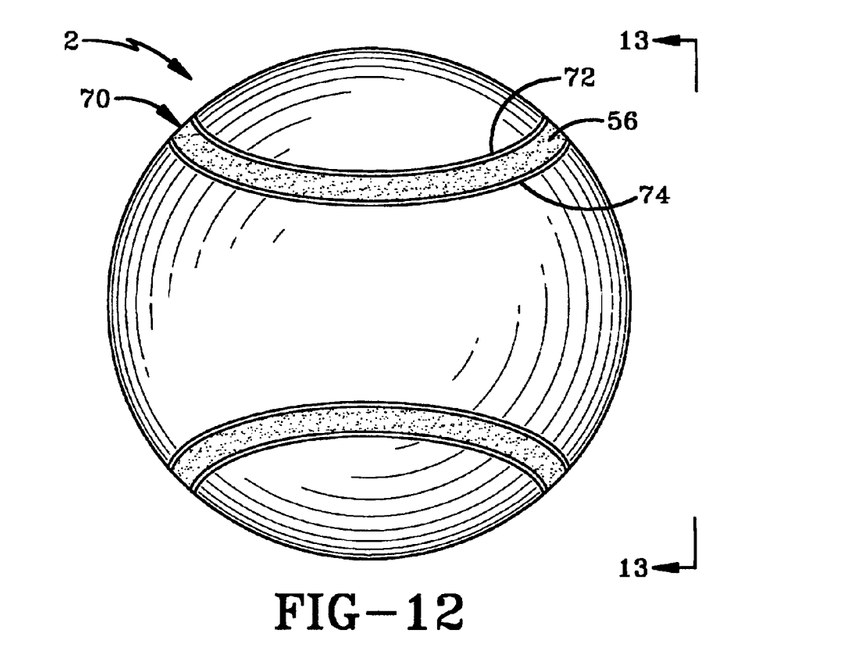
FIG. 12 is a front elevation view of a fifth embodiment of the monitoring device of the present invention.
Figure 13:
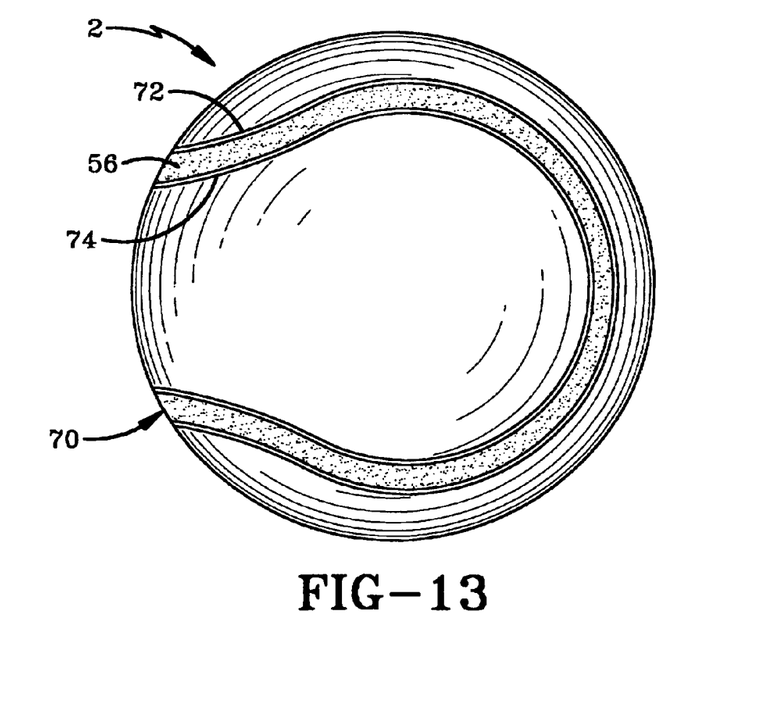
FIG. 13 is a side elevation view taken along line 13-13 of FIG. 12.

A fifth embodiment of the monitoring device of the invention is indicated generally by the numeral 2 in FIGS. 12 and 13. In this embodiment, the antenna 70 includes a two conductive bodies 72 and 74 that extend through the body of device 2. In the exemplary embodiment, each body 62 and 64 forms a serpentine pattern when it ends at the outer surface of device 2. Bodies 72 and 74 are spaced apart to form a cavity that extends from the center of device 2 out of the body of device 2 in a serpentine slot that extends about the body of device 2 such that at least two portions of the slot may be viewed in the six possible elevation views of device 2. The cavity may be filled with a filler material 56. In other embodiments, the cavity may be left hollow with mechanical spacers used to maintain the spacing between bodies 72 and 74. The size and spacing of bodies 72 and 74 and the type of material 56 are used to tune antenna 70. Bodies 72 and 74 thus divide the body of device 2 into two portions. As above, the monitoring assembly may be disposed in one or both of the two portions to balance device 2 as desired.

Antenna 70 is fed at the center of one of the two opposed bodies 72 while the other of the two opposed bodies 74 function as the ground plane of antenna 70. Antenna 70 will radiate signals from the entire circumference of the serpentine slot. Some portion of the radiated signals will thus pass through sidewall 8 regardless of the orientation of device 2.

In each of the third, fourth and fifth embodiments, the conductive bodies do not have to extend entirely through the body of the monitoring device as shown in the drawings. For example, the conductive bodies may be configured such that the cavity defined between the bodies is a channel that extends from the slot into the body of the monitoring device. In the case of the third embodiment, each conductive body 52 and 54 may be in the shape of a flat doughnut or a flat washer (the shape formed by a reference plane passed through the diameter of a torus).

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described. For example, the non-attached monitoring device described in the exemplary embodiment of the invention is used with pneumatic tires having attenuating sidewalls. These monitoring devices may also be used in other applications wherein an attenuating body is disposed between the monitoring device and the reader. Exemplary applications include types of silos, freezers, pumps, and pipes.

We claim:

1. A monitoring device for monitoring an engineering condition of the environment in which the monitoring device is disposed; the monitoring device comprising:

a body having an outer surface;

a monitoring assembly disposed within the body; and an antenna electrically connected to the monitoring assembly; the antenna including first and second conductive bodies; the first conductive body being spaced from the second conductive body to define an antenna slot; one of the first and second conductive bodies having a feed point disposed within the body of the monitoring device; the feed point being electrically connected with the monitoring assembly; and the antenna slot defined by the first and second conductive bodies extending to the outer surface of the body.

2. The monitoring device of claim 1, wherein the antenna slot is filled with a dielectric material.

3. The monitoring device of claim 1, wherein the first and second conductive bodies are parallel to each other.

4. The monitoring device of claim 3, wherein the first and second conductive bodies are circular.

5. The monitoring device of claim 1, wherein the shape of the slot at the outer surface of the body is circular.

6. The monitoring device of claim 1, wherein the shape of the slot at the outer surface of the body is serpentine.

7. The monitoring device of claim 1, wherein the monitoring assembly is encapsulated with an encapsulation material.

8. The monitoring device of claim 1, wherein the antenna further includes third and fourth conductive bodies that define a second antenna slot in cooperation with the first and second conductive bodies; the antenna slots being disposed perpendicular to each other.

9. In combination, a tire and a non-attached monitoring device for monitoring an engineering condition of the environment inside the tire; the combination comprising:

the monitoring device having a body having an outer surface; the body being free to move within the tire;

a monitoring assembly disposed within the body of the monitoring device; and an antenna electrically connected to the monitoring assembly; the antenna including an antenna body that is looped back on itself through a 180 degree arc.

10. The combination of claim 9, further comprising a ground plane for the antenna; the antenna body being disposed in a reference plane that is perpendicular to the ground plane.

11. The combination of claim 10, wherein the monitoring assembly and at least a portion of the antenna are encapsulated with an encapsulation material.

12. The combination of claim 11, wherein the antenna in entirely disposed within the encapsulation material.

13. The combination of claim 9, further comprising a ground plane for the antenna; the antenna body being disposed in a reference plane that is parallel to the ground plane.

14. The combination of claim 13, further comprising an encapsulation material that entirely surrounds the monitoring assembly and the antenna.

15. The combination of claim 9, wherein the monitoring assembly includes a circuit board; the circuit board having a width and a length; the length being greater than or equal to the width; the antenna defining an arc; the arc having a width that is less than the length of the circuit board.

16. The combination of claim 15, wherein the monitoring assembly and antenna are encapsulated with an encapsulation material.

17. The combination of claim 9, wherein the tire is an oriented attenuating body having a minimum attenuating level and a maximum attenuating level; the antenna adapted to transmit a signal oriented to the minimum attenuating level of the tire regardless of the position of the monitoring device with respect to the tire.

18. The combination of claim 9, wherein the antenna has a first end and a second end with an antenna body disposed between the ends; the first and second ends being connected to the monitoring assembly at spaced locations.

19. The combination of claim 18, further comprising a ground plane for the antenna; the first and second ends of the antenna defining the maximum width of the antenna with no portion of the antenna body extending beyond the width defined by the ends when viewed in a direction substantially normal to the ground plane of the antenna.

20. The combination of claim 19, wherein the antenna includes a pair of legs that define the ends of the antenna; the legs being disposed perpendicular to the ground plane of the antenna.

* * * * *